United States Patent
Mizosoe et al.

(10) Patent No.: US 8,902,991 B2
(45) Date of Patent: Dec. 2, 2014

(54) DECODING APPARATUS FOR ENCODED VIDEO SIGNALS

(75) Inventors: Hiroki Mizosoe, Kawasaki (JP); Takuya Imaide, Fujisawa (JP)

(73) Assignee: Hitachi Maxell, Ltd., Osaka (JP)

( * ) Notice: Subject to any disclaimer, the term of this patent is extended or adjusted under 35 U.S.C. 154(b) by 1270 days.

(21) Appl. No.: 11/369,004

(22) Filed: Mar. 7, 2006

(65) Prior Publication Data
US 2007/0030392 A1 Feb. 8, 2007

(30) Foreign Application Priority Data
Aug. 8, 2005 (JP) ................................. 2005-229013

(51) Int. Cl.
*H04N 11/02* (2006.01)
*H04N 9/82* (2006.01)
*H04N 5/45* (2011.01)
*H04N 5/85* (2006.01)

(52) U.S. Cl.
CPC ............... *H04N 5/45* (2013.01); *H04N 9/8205* (2013.01); *H04N 5/85* (2013.01)
USPC .................................................... 375/240.25

(58) Field of Classification Search
CPC ............. H04N 5/45; H04N 5/85; H04N 5/77; H04N 9/8205
USPC ...................... 375/240.25; 348/565, E05.112; 386/108, 95, 125, 46, 52; 704/500; 710/68; 382/276, 232
See application file for complete search history.

(56) References Cited

U.S. PATENT DOCUMENTS 5,365,278 A 11/1994 Willis
5,557,338 A * 9/1996 Maze et al. ...................... 725/38
(Continued)

FOREIGN PATENT DOCUMENTS

| JP | 10-070706 A | 3/1998 |
| JP | 2000-134572 | 5/2000 |
| JP | 2005110121 A | 4/2005 |
| JP | 2007-033946 A | 2/2007 |

OTHER PUBLICATIONS

Chinese Office Action, w/ English translation thereof, issued in Chinese Patent Application No. CN 200610066683.6 dated Apr. 17, 2009.

(Continued)

*Primary Examiner* — Shuwang Liu
*Assistant Examiner* — Helene Tayong
(74) *Attorney, Agent, or Firm* — McDermott Will & Emery LLP

(57) ABSTRACT

The present invention is a decoding apparatus for decoding an encoded video signal capable of displaying a secondary video synchronously with a primary video. The decoding apparatus includes: an auxiliary information analyzing part that analyzes auxiliary information including display auxiliary information about a display position and/or a display size of the secondary video, and applied time information by which the display auxiliary information is applied; a reference time counter that indicates a reference time at which a video is decoded and displayed; a comparing part that compares the applied time information with the reference time counter; a display screen forming part that uses a primary video and a secondary video to form a display screen; and a control part that controls the display screen forming part, wherein the control part controls the display position and/or the display size of the secondary video by affording a command to the display screen forming part using the display auxiliary information, based on an output result of the comparing part.

5 Claims, 4 Drawing Sheets

(56) References Cited

U.S. PATENT DOCUMENTS

| | | | |
|---|---|---|---|
| 6,070,236 A | 5/2000 | Winter | |
| 6,104,838 A * | 8/2000 | Chang et al. | 382/250 |
| 6,137,953 A * | 10/2000 | Fujiwara et al. | 386/337 |
| 6,253,025 B1 * | 6/2001 | Kitamura et al. | 386/351 |
| 6,266,478 B1 | 7/2001 | Yoshio et al. | |
| 6,278,836 B1 * | 8/2001 | Kawara et al. | 386/230 |
| 6,346,971 B1 * | 2/2002 | Numata | 348/564 |
| 6,411,774 B1 * | 6/2002 | Tomita et al. | 386/344 |
| 2001/0015770 A1 * | 8/2001 | Vaughan et al. | 348/564 |
| 2002/0034375 A1 * | 3/2002 | Suda | 386/95 |
| 2002/0103855 A1 * | 8/2002 | Chatani | 709/203 |
| 2002/0140861 A1 | 10/2002 | Janevski et al. | |
| 2003/0063747 A1 * | 4/2003 | Petrovic | 380/238 |
| 2003/0068161 A1 | 4/2003 | Lasorsa et al. | |
| 2003/0152370 A1 | 8/2003 | Otomo et al. | |
| 2004/0098730 A1 * | 5/2004 | Foote et al. | 719/320 |
| 2004/0136698 A1 | 7/2004 | Mock | |
| 2004/0146111 A1 | 7/2004 | Dutey et al. | |
| 2005/0049006 A1 * | 3/2005 | Lee | 455/566 |
| 2005/0169606 A1 | 8/2005 | Yoo et al. | |
| 2005/0238323 A1 * | 10/2005 | Takashima et al. | 386/69 |
| 2005/0265693 A1 * | 12/2005 | Abe et al. | 386/52 |
| 2006/0015602 A1 * | 1/2006 | Inoue et al. | 709/223 |
| 2006/0153036 A1 * | 7/2006 | Tomoda et al. | 369/53.16 |
| 2006/0165378 A1 * | 7/2006 | Noda et al. | 386/95 |
| 2007/0011552 A1 * | 1/2007 | Altmann | 714/746 |
| 2007/0025699 A1 * | 2/2007 | Kim et al. | 386/95 |
| 2007/0025700 A1 * | 2/2007 | Kim | 386/95 |
| 2007/0041711 A1 * | 2/2007 | Kim et al. | 386/95 |
| 2007/0258010 A1 * | 11/2007 | Hong et al. | 348/564 |

OTHER PUBLICATIONS

Japanese Office Action issued in Japanese Patent Application No. 2005-229013, dated Jul. 26, 2011.

US Office Action issued in U.S. Appl. No. 12/182,631 dated Apr. 26, 2012.

United States Office Action issued in U.S. Appl. No. 12/182,641 dated Aug. 27, 2012.

United States Office Action issued in U.S. Appl. No. 12/182,641 dated May 7, 2012.

United States Office Action issued in U.S. Appl. No. 12/182,641 issued Feb. 28, 2013.

United States Office Action issued in U.S. Appl. No. 12/182,641 dated Jul. 3, 2013.

Japanese Notice of Reason of Rejection issued in Japanese Application No. 2011-022253 dated Feb. 10, 2014, w/Partial English translation.

United States Office Action issued in U.S. Appl. No. 12/182,631 dated Oct. 24, 2013.

* cited by examiner

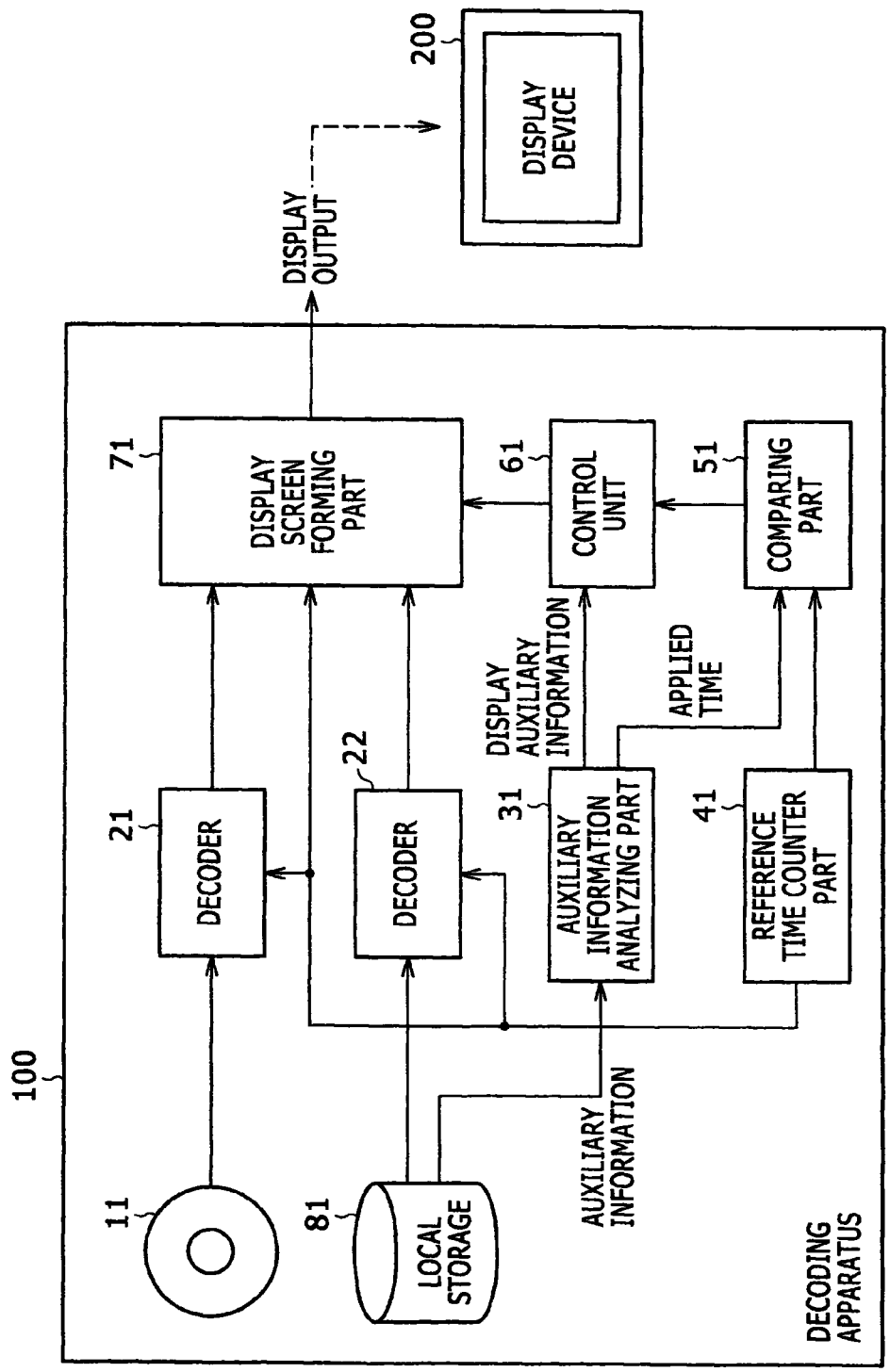

PRIMARY VIDEO  SECONDARY VIDEO

SECONDARY VIDEO  PRIMARY VIDEO

DECODING APPARATUS FOR ENCODED VIDEO SIGNALS

CLAIM OF PRIORITY

The present application claims priority from Japanese application serial No. P2005-229013, filed on Aug. 8, 2005, the content of which is hereby incorporated by reference into this application.

BACKGROUND OF THE INVENTION

1. Field of the Invention

The present invention relates to a decoding technique for decoding encoded video signals for the purpose of display.

2. Description of the Related Art

The background arts of the present invention include an art described in JP-A No. 134572/2000 and an art described in ISO/IEC 13818-2 (MPEG2 Video) of a non-patent document. In JP-A No. 134572/2000, as a problem to be solved by an invention, an art of "outputting videos, sounds, subpictures, and the like by digital signals to a digital TV receiver from a reproducing apparatus such as a DVD player" is described. A means for solving the problem is described as "A PCM voice signal decoded by a voice decoder 11 is timed in a presentation engine 17, and then is converted into a packet in a PCM/1394 packet conversion part 27. A subpicture decoded in a subpicture decoder 15 is timed in the presentation engine 17, and then is converted into a packet in a 1394 packet conversion part 29. Video PES is converted into TS along with SCR in an MPEG-PS/TS conversion part 25, and is converted into a packet in an MPEG-TS/1394 packet conversion part 31. Each isochronous packet is sent to a digital TV via a link layer 33 and a physical layer 35." An art for specifying the display position and the display size of an encoded video signal is described in the ISO/IEC 13818-2 (MPEG2 Video).

Recently, a DVD (Digital Versatile Disc) player has come into wide use as a kind of a decoding display device that decodes an encoded video signal for display. The DVD player reads bit streams from a disc in which encoded video signals are stored, and decodes the video signals by a decoder in the player to display the decoded video signals.

In a DVD, a secondary video called a subpicture in addition to a primary video can be reproduced. The secondary video may be closely related to the primary video, and in such a case, it is desirable that the primary video and the secondary video are synchronously displayed. For example, in the above-described JP-A No. 134572/2000, an art for synchronously displaying a primary video and a secondary video is disclosed.

On the other hand, it is preferable that, when a primary video and a secondary video are displayed in combination, the position and the size of the secondary video can be changed according to the contents of the primary video. For example, in FIG. 2A, to avoid a person in a primary video from being hidden by a secondary video, the secondary video is superimposed in an upper right portion. On the other hand, in FIG. 2B, the person in the primary video moves to the right within the video. At this time, if the position of the secondary video is unchanged from that in FIG. 2A, the secondary video would hide the person. Hence, if the display position of the secondary video can be moved to the left as shown in FIG. 2B according to the movement of the person in the primary video, the person would not be hidden.

In the case of this example, since a display position of the secondary video must be specified taking harmony with the primary video into account, it is preferable to provide a system which permits the contents producer of the primary video to specify the display position of the secondary video. In this case, it is preferable that a display position and a display size can be specified on a frame basis. The same is also true for the image size of secondary video.

An art of specifying a display position and a display size of an encoded video signal is disclosed in ISO/IEC 13818-2 (MPEG2 Video). In the art, information of a display position and a display size is inserted in an encoded video signal, and the display position can be specified on a frame basis.

By the way, the contents of such additional information for a secondary video signal such as a display position and a display size are strongly dependent on applications. That is, various types of systems such as different types of storage media including a DVD, and distributions by broadcasting systems and the Internet employ encoded video signals, and in each of the systems, required functions, types of additional information, formats, and transmission methods generally differ.

Hence, if the analysis and extraction of such additional information were performed by hardware, it would be difficult to provide the flexibility to accommodate various applications. If new applications emerge in the future, the hardware will have to be changed to accommodate them, requiring high costs.

On the other hand, if additional information is analyzed and extracted by software, flexibility can be provided, so that it is possible to relatively easily cope with new applications that may emerge in the future. However, processing by software can be slow because of its processing speed, so that the above-described specification on a frame basis may not be guaranteed.

A problem of the present invention is to realize in view of the above circumstances a decoding display device which decodes encoded video signals, which can specify the display position and the display size of secondary videos and the like on a frame basis, and which are flexible in specification method.

An object of the present invention is to solve the problem and provide a decoding apparatus with increased usability.

SUMMARY OF THE INVENTION

The present invention is an art by which the above-described problem has been solved.

The present invention is a decoding apparatus for decoding an encoded video signal capable of displaying a secondary video synchronously with a primary video. The decoding apparatus includes: an auxiliary information analyzing part that analyzes auxiliary information including display auxiliary information about the display position and/or the display size of the secondary video, and applied time information by which the display auxiliary information is applied; a reference time counter that indicates a reference time at which a video is decoded and displayed; a comparing part that compares the applied time information with the reference time counter; a display screen forming part that uses a primary video and a secondary video to form a display screen; and a control part that controls the display screen forming part, wherein the control part controls the display position and/or the display size of the secondary video by affording a command to the display screen forming part using the display auxiliary information, based on an output result of the comparing part.

The present invention is a decoding apparatus that decodes an encoded video signal including a frame ID for uniquely identifying a frame in encoded information of the frame and decodes an encoded video signal capable of displaying a secondary video synchronously with a primary video. The decoding apparatus includes: an auxiliary information analyzing part that analyzes auxiliary information including display auxiliary information about the display position and/or the display size of the secondary video, and applied frame ID information by which the display auxiliary information is applied; a frame ID analyzing part that analyzes the frame ID of a frame included in the encoded video signal; a comparing part that compares the applied frame ID information with the frame ID of the frame; a display screen forming part that uses a primary video and a secondary video to form a display screen; and a control part that controls the display screen forming part, wherein the control part controls the display position and/or the display size of the secondary video by affording a command to the display screen forming part using the display auxiliary information, based on an output result of the comparing part.

The present invention is a decoding apparatus including: a first input part to which a first encoded video signal is inputted; a second input part to which a second encoded video signal is inputted; a first decoding part that decodes the first encoded video signal; a second decoding part that decodes the second encoded video signal; an output part that outputs video signals decoded by the first and the second decoding parts to display them in the display part; and a control part that controls information about a display position and/or a display size for the display part, of the video signal decoded by the second decoding part, wherein the control part performs control so that the video signal decoded by the second decoding part is displayed synchronously with the video signal decoded by the first decoding part.

According to the present invention, the usability of a decoding apparatus can be increased.

BRIEF DESCRIPTION OF THE DRAWINGS

FIG. 1 is a block diagram of a video disc reproducing apparatus according to a first embodiment of the present invention;

DETAILED DESCRIPTION OF THE PREFERRED EMBODIMENTS

Figure 2A:
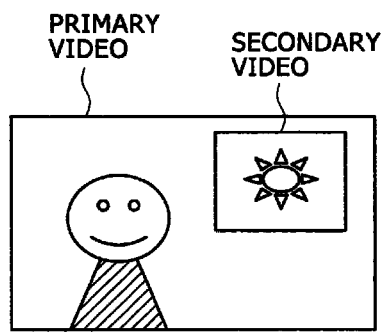
FIGS. 2A and 2B are drawings for explaining the superimposing of a primary video and a secondary video in the embodiment of FIG. 1.
Figure 2B:
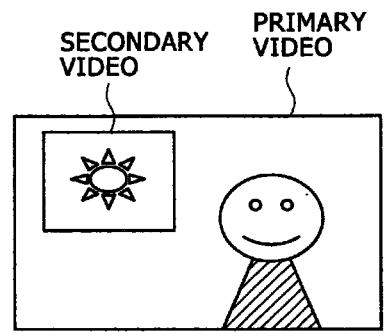

Hereinafter, embodiments of the present invention will be described with reference to the accompanying drawings.

Secondary videos (subpictures and the like) in a DVD and secondary videos and the like are different from each other in the following points. That is, subpictures in the DVD are images such as OSD images that have a smaller number of levels of gray than primary videos and are irregularly updated in seconds, while secondary videos in embodiments below are natural images that have the number of levels of gray and a frame rate that are equal to those of primary videos. Because of the above-described characteristics, DVD subpictures are sufficiently covered by a simple encoding system such as run length compression, while secondary videos in embodiments below require the use of an advanced moving image compression method using frame correlation as typified by MPEG, and require decoders equivalent to those for primary videos.

First Embodiment

FIG. 1 is a block diagram of a video disc reproducing apparatus according to a first embodiment of the present invention. An encoded video signal of a primary video, and an encoded video signal and auxiliary information of a secondary video are stored in a disc 11 and a local storage 81, respectively. The encoded video signal of the primary video read from the disc 11 is inputted to a decoder 21. The inputted encoded video signal is decoded in the decoder 21, and the resulting primary video is outputted to a display screen forming part 71.

Likewise, the encoded video signal of the secondary video read from the local storage 81 is inputted to a decoder 22. The inputted encoded video signal is decoded in the decoder 22, and the resulting secondary video is outputted to the display screen forming part 71. A reference time counter part 41 counts reference time for performing decoding, and outputs the reference time to the decoders 21 and 22, the display screen formation part 71, and a comparing part 51. The decoders 21 and 22 perform decoding processing based on the reference time outputted from the reference time counter part 41. Thereby, the primary video and the secondary video can be synchronized to perform decoding processing.

Furthermore, auxiliary information is read from the local storage 81. The read auxiliary information is sent to an auxiliary information analyzing part 31. The auxiliary information analyzing part 31 analyzes the auxiliary information, and extracts display auxiliary information about the display position and the display size of the secondary video, and applied time information by which the display auxiliary information is applied. The extracted display auxiliary information is sent to a control part 61. The extracted applied time Information is sent to the comparing part 51. Since the above-described analysis of the auxiliary information can be performed before decoding the video signal, the auxiliary information can be analyzed with sufficient time. Therefore, in this embodiment, part of processing in the auxiliary information analyzing part 31 is performed by the software processing.

Figure 3:
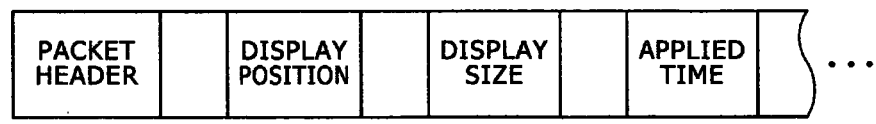
FIG. 3 is a drawing for explaining auxiliary information in the embodiment of FIG. 1.

The following describes in more detail processing in the auxiliary information analyzing part 31. FIG. 3 shows part of auxiliary information supplied in the form of a bit stream to the auxiliary information analyzing part 31. The auxiliary information is delimited in units of packets, and a packet header is inserted for each packet. Information about the display position of a secondary video and information about its display size are stored in fixed positions of the packet, respectively, and the information can be extracted by a CPU. The above-described display size is represented by the respective numbers of horizontal and vertical pixels of the secondary video to be displayed.

The comparing part 51 compares the applied time information with a reference time inputted from the reference time counter 41, and outputs the comparison result to the control part 61. When the comparison result inputted from the comparing part 51 indicates "match," the control part 61 affords a command on the display position and the display size of the secondary video to the display screen forming part 71 by using display auxiliary information inputted from the auxiliary information analyzing part 31. The display screen forming part 71 synthesizes the screen of the primary video and the screen of the secondary video to form a display screen. At this time, according to a command from the control part 61, the display screen forming part 71 zooms in or out the secondary video for conversion into a specified image size. Furthermore, according to a command from the control part 61, the display screen forming part 71 superimposes the secondary video at a position specified for the primary video. The formed display screen is outputted from the video disc reproducing apparatus as image output. The screen outputted from the decoding apparatus 100 is displayed in a display device 200.

As described above, according to the first embodiment, the display position and the display size of the secondary video can be applied accurately at a time specified by the applied time information. Furthermore, since part of processing in the auxiliary information analyzing part 31 can be performed by the software processing, it is possible to flexibly cope with changes of types of additional information and formats that might be made to meet various applications.

In the above description, an example is shown in which a display size is represented by the respective numbers of horizontal and vertical pixels of the secondary video to be displayed, However, the display size may be represented by a scale factor of the size of an image to be displayed to an encoded image size of the secondary video, instead of the pixel number information, by calculating the ratio between an encoded image size of the secondary video and the size of an image to be displayed, processing for finding a zooming-out/zooming-in rate for the secondary video may be omitted. In other points, it is possible to obtain almost the same effects as in this embodiment.

Second Embodiment

Figure 4:
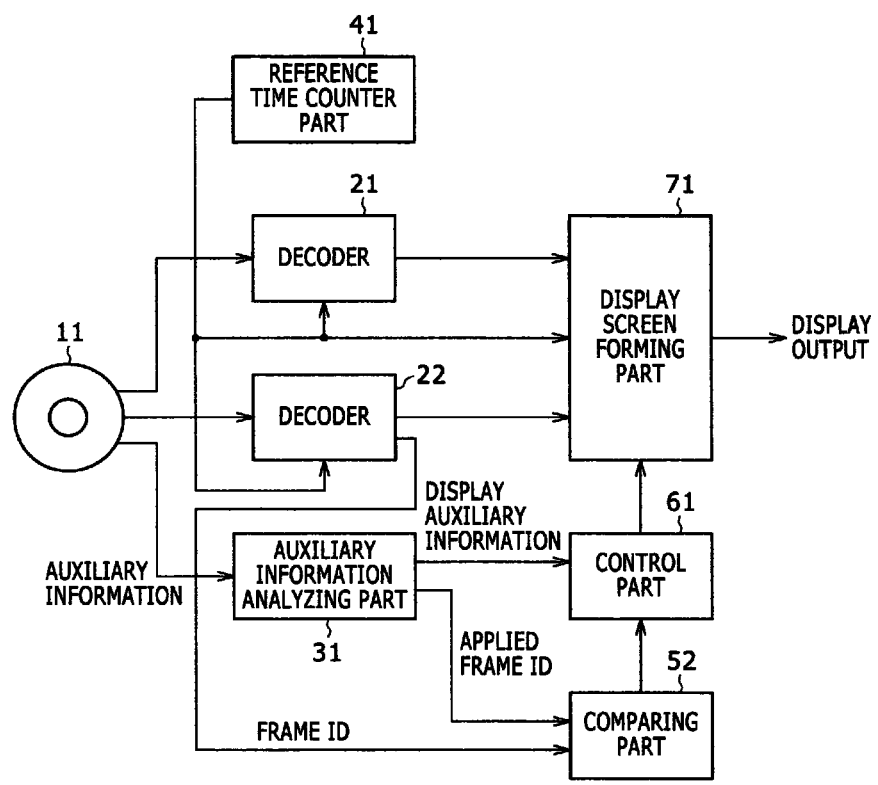
FIG. 4 is a block diagram showing a video disc reproducing apparatus as another embodiment of the present invention.

FIG. 4 is a block diagram showing a video disc reproducing apparatus according to a second embodiment of the present invention. Duplicate descriptions of the same portions as in the first embodiment will be omitted.

In the second embodiment, unlike the first embodiment, secondary videos and auxiliary videos are recorded in the disc 11 along with primary videos. When secondary videos and auxiliary information are recorded in the disc 11 as in the second embodiment, the secondary videos can be viewed even in an environment in which connection to a network is not made, as described later. On the other hand, when secondary videos and auxiliary information are recorded in the local storage 81 as in the first embodiment, even when they are not recorded in the disc 11, the secondary videos can be viewed after subsequently obtaining both of them through a removable recording media and a network. Even when secondary videos and auxiliary information are recorded in the disc 11, advantageously, the most recent secondary video can be viewed after subsequently obtaining the most recent version of both of them.

In the second embodiment, an encoded video signal includes a frame ID for uniquely identifying each frame in encoded information of the frame. The decoder 22 extracts the frame ID of the frame when decoding a secondary video, and outputs the extracted frame ID to the comparing part 52.

Figure 5:
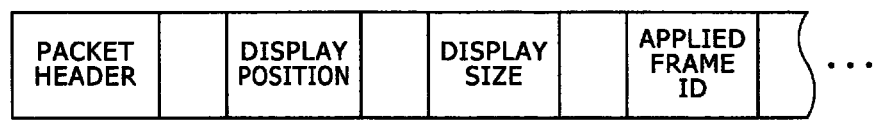
FIG. 5 is a drawing for explaining auxiliary information in an embodiment of FIG. 4.

FIG. 5 shows part of auxiliary information inputted to the auxiliary information analyzing part 31. In FIG. 5, applied frame ID information is inserted instead of applied time information in FIG. 3. The applied frame ID is extracted and outputted to the comparing part 52. The comparing part 52 compares the applied frame ID information with the frame ID of a frame inputted from the decoder 22, and outputs a comparison result to the control part 61.

By the above-described construction, when a system is used in which an encoded video signal includes a frame ID for uniquely identifying each frame in encoded information of the frame, the same effects as in the first embodiment can be obtained.

Third Embodiment

The following describes a third embodiment of the present invention. Duplicate descriptions of the same contents as in the first embodiment will be omitted. A difference from the first embodiment is in the contents of auxiliary information, which is afforded as a command to the CPU in the third embodiment.

Figure 6:
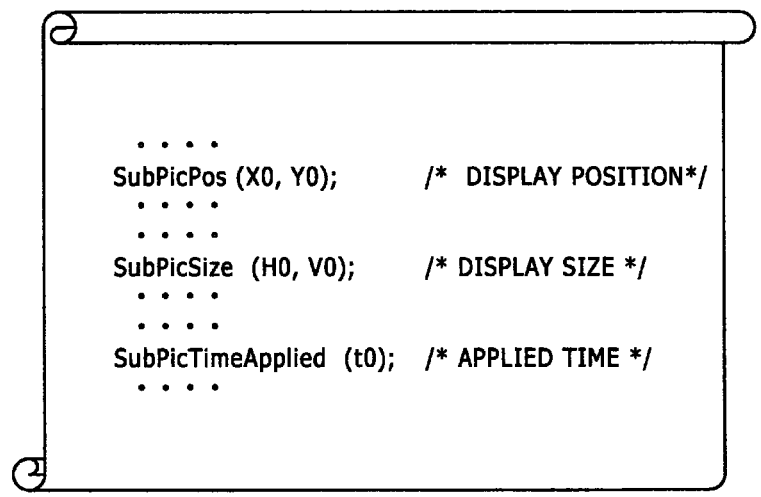
FIG. 6 is a drawing for explaining auxiliary information in an embodiment of FIG. 4.

FIG. 6 shows part of auxiliary information supplied to the auxiliary information analyzing part 31. The auxiliary information is afforded to the CPU as a command of a language such as the JAVA (registered trademark) language. In the third embodiment, since part of processing of the auxiliary information analyzing part 31 is performed by software processing, the supplying of auxiliary information in the form of commands as described above provides an advantage of being capable of smoothly handling the information. Also in other points, the same effects as in the first embodiment can be obtained.

Fourth Embodiment

The following describes a fourth embodiment of the present invention. Hereinafter, only differences from the first embodiment will be described.

The fourth embodiment is characterized by including special effect information about the movement of the display position of secondary video in auxiliary information. Specifically, a movement quantity dX in a horizontal direction of secondary video per unit time, applied start time t0 at which the application of display position is started, and applied lasting time tLAST during which the movement of display position is applied are included in the auxiliary information. Thereby, when the display position of the secondary video in the horizontal direction at time t0 is x0, the display position of the secondary video in the horizontal direction at time t0+t ($0 \leq t \leq$ LAST) can be represented as x0+t×dX. The same is also true for the vertical direction. The time information used here is assumed to have resolutions in which time can be specified with an accuracy higher than at least one frame unit.

An advantage of the fourth embodiment is the reduction in an encoding quantity of auxiliary information necessary to specify the position of a secondary video moving continuously at a constant speed, with the result that a disc capacity for storing the auxiliary information can be reduced.

The number of frames may be used instead of the above-described concept of time. That is, the same effects can be obtained by substituting "per frame", "applied start frame ID", and "applied last frame count" for "per unit time", "applied start time", and "applied last time", respectively.

Fifth Embodiment

The following describes a fifth embodiment of the present invention. Hereinafter, only differences from the first embodiment will be described.

The fifth embodiment is characterized by including special effect information about the movement of the display position of secondary video in auxiliary information. Specifically, a movement quantity dX in a horizontal direction of secondary video per unit time, applied start time t0 at which the application of display position is started, and applied end time tE at which the movement of display position is ended are included in the auxiliary information. Thereby, when the display position of the secondary video in the horizontal direction at time t0 is x0, the display position of the secondary video in the horizontal direction at time t0+t (0≤t≤E−t0) can be represented as x0+t×dX. The same is also true for the vertical direction.

An advantage of the fifth embodiment is the reduction in an encoding quantity of auxiliary information necessary to specify the position of a secondary video moving continuously at a constant speed, with the result that a disc capacity for storing the auxiliary information can be reduced.

The number of frames may be used instead of the above-described concept of time. That is, the same effects can be obtained by substituting "per frame", "applied start frame ID", and "applied end frame ID" for "per unit time", "applied start time", and "applied last time", respectively.

Sixth Embodiment

The following describes a sixth embodiment of the present invention. Hereinafter, only differences from the first embodiment will be described.

The sixth embodiment is characterized by including special effect information about changes of the display scale factor of secondary video in auxiliary information. Specifically, a change quantity dS in a horizontal direction of secondary video per unit time, applied start time t0 at which the application of display size change is started, and applied lasting time tLAST during which display size change is applied are included in the auxiliary information. Thereby, when the display size (scale factor) of the secondary video in the horizontal direction at time t0 is S0, the display position of the secondary video in the horizontal direction at time t0+t (0≤t≤LAST) can be represented as S0+t×dS.

An advantage of the sixth embodiment is the reduction in an encoding quantity of auxiliary information necessary to specify the display size of a secondary video zoomed in or out continuously at a constant speed, with the result that a disc capacity for storing the auxiliary information can be reduced.

The number of frames may be used instead of the above-described concept of time. That is, the same effects can be obtained by substituting "per frame", "applied start frame ID", and "applied last frame count" for "per unit time", "applied start time", and "applied last time", respectively.

The above embodiments have been described with respect to a video disc reproducing apparatus. The present invention is not limited to the above embodiments. The same effects can also be expected in a receiver to which encoded videos are transmitted over radio waves or cables. In an example of movie, when a movie main volume for primary videos is reproduced, secondary videos related to scenes of the main volume are obtained through a network and decoded in a display device, and then the secondary videos are synchronized with the main volume or superimposed to make the movie more interesting as secondary videos of scenes related to the main volume.

As an embodiment different from the above-described embodiments, a decoding apparatus constructed as follows can increase usability. The decoding apparatus includes: a first input part to which a first encoded video signal is inputted; a second input part to which a second encoded video signal is inputted; a first decoding part that decodes the first encoded video signal; a second decoding part that decodes the second encoded video signal; an output part that outputs the video signals encoded by the first and the second encoding parts to a display part for display; and a control part that controls information about a display position and/or a display size for the display part, of the video signal decoded by the second decoding part, wherein the control part performs control so that the video signal decoded by the second decoding part is displayed synchronously with the video signal decoded by the first decoding part.

A decoding video display device constructed as follows can also increase usability. Information about a display position and/or display size to the display part includes information about time, and the control part performs control to display the video signal decoded by the second decoding part synchronously with the video signal decoded by the first decoding part according to the information about time.

A decoding method constructed as follows can also increase usability. A first encoded video signal is inputted, a second encoded video signal is inputted, the first inputted encoded video signal is decoded, the second inputted encoded video signal is decoded, information about a display position and/or a display size for the display part, of the second decoded video signal, is controlled, and according to the information about a display position and/or a display size for the display part, the second decoded video signal is displayed synchronously with the first decoded video signal.

The usability of the decoding apparatus can be increased by a disc recording medium in which a first encoded video signal and a second encoded video signal are recorded and in which information about the display position and/or the display size and timing of the second video signal is recorded so that the first encoded video signal and the second encoded video signal are decoded to display the second video signal synchronously with the first video signal.

A decoding apparatus connectable with a display part, constructed as follows can also increase usability. The decoding apparatus includes: a first decoding part that decodes a first encoded video; a second decoding part that decodes a second encoded video; an output part that synchronously outputs the second decoded video signal to the display part when outputting the first decoded video to the display part; an analyzing part that, when outputting the second decoded video to the display part synchronously with the first decoded video, analyzes auxiliary information about the display position and/or the display size and applied time of the second decoded video for the display part; a time counter that indicates an output time of the first decoded video; a comparing part that compares the applied time with an output time indicated by the counter; and a control part that controls the output part to output the second decoded video synchronously with the first decoded video according to the comparison of the comparing part and the auxiliary information.

A decoding apparatus connectable with a display part, constructed as follows can also increase usability. The decoding apparatus includes: a first decoding part that decodes a first encoded video; a second decoding part that decodes a second encoded video; an output part that outputs the second decoded video signal to the display part synchronously with the first decoded video signal; an acquiring part that acquires information about a position, size, and applied time for outputting the second decoded video to the display part; and a control part that controls the output part and the acquiring part, wherein the control part controls the output part so that the second decoded video is superimposed on the first decoded video according to the information acquired by the acquiring part and displayed in the display part.

A decoding apparatus connectable with a display part, constructed as follows can also increase usability. The decoding apparatus includes: a first decoding part that decodes a first encoded video; a second decoding part that decodes a second encoded video; a processing part that processes information about the position, size, and applied time of the second decoded video; a display screen forming part that superimposes the second decoded video on the first decoded video; a control part that controls the display screen forming part according to information processed by the processing part; and an output part that outputs a video formed by the display screen forming part.

A disc device connectable with a display part, constructed as follows can also increase usability. The disc device includes: a reproducing part that reproduces video signals from a disc; a first decoding part that decodes a first encoded video reproduced in the reproducing part; a second decoding part that decodes a second encoded video; a processing part that processes information about the position, size, and applied time of the second decoded video; a display screen forming part that superimposes the second decoded video on the first decoded video; a control part that controls the display screen forming part according to information processed by the processing part; and an output part that outputs a video formed by the display screen forming part.

By the above-described constructions, a decoding display device can be provided which decodes encoded video signals which specify the display position and the display size of secondary videos on a frame basis, and which are flexible in specification method.

The present invention can be implemented in embodiments other than the above-described embodiments without departing from the spirit and major characteristics of the present invention. Therefore, it is to be understood that any of the above-described embodiments is merely one example of the present invention and should not be limitedly understood. The scope of the present invention is indicated by claims. Variations and modifications belonging to a scope equal to the scope of the claims are all within the scope of the present invention.

What is claimed is:

1. An information reproducing method which reproduces information based on an encoded video signal of a primary video, an encoded video signal of a secondary video, and auxiliary information which includes display auxiliary information about a display position of the secondary video and applied start time information which indicates a start timing at which the display auxiliary information is applied, the method comprising the steps of:
    decoding the encoded video signal of the primary video read out from a recording medium, and the encoded video signal of the secondary video read out from a local storage;
    extracting the display auxiliary information and the applied start time information from the auxiliary information, the auxiliary information being read out from the local storage; and
    outputting the secondary video based on the applied start time information and reference time information at which the primary video is reproduced, while outputting the primary video,
    wherein:
    the secondary video is output while being superimposed on the primary video;
    when the applied start time information matches the reference time information, application of the display auxiliary information is started, and the display position of the decoded secondary video is controlled based on the display auxiliary information;
    the encoded video signal of the secondary video and the auxiliary information are downloaded via a network to the local storage;
    no auxiliary information is included in a stream of the encoded video signal of the secondary video in the local storage; and
    control of the display position is implemented by a processor which executes software programs, and a part of the auxiliary information is provided to the processor as a command of a JAVA language.

2. An information recording method which records information on a recording medium or in a local storage, the method comprising the steps of:
    recording an encoded video signal of a primary video on the recording medium;
    recording an encoded video signal of a secondary video in the local storage; and
    recording in the local storage an auxiliary information which includes display auxiliary information about a display position of the secondary video and applied start time information which indicates a start timing at which the display auxiliary information is applied,
    wherein:
    when the recorded information is reproduced, the secondary video is output while being superimposed on the primary video;
    when the applied start time information matches reference time information at which the primary video is reproduced, application of the display auxiliary information is started, and the display position of the recorded secondary video is controlled based on the display auxiliary information;
    the encoded video signal of the secondary video and the auxiliary information are downloaded via a network to the local storage;
    no auxiliary information is included in a stream of the encoded video signal of the secondary video in the local storage; and
    control of the display position is implemented by a processor which executes software programs, and a part of the auxiliary information is provided to the processor as a command of a JAVA language.

3. An information reproducing apparatus that reproduces information based on an encoded video signal of a primary video, an encoded video signal of a secondary video, and auxiliary information which includes display auxiliary information about a display position of the secondary video and applied start time information which indicates a start timing at which the display auxiliary information is applied, the apparatus comprising:
    a first decoder that decodes the encoded video signal of the primary video, the encoded video signal of the primary video being read out from a recording medium;
    a second decoder that decodes the encoded video signal of the secondary video, the encoded video signal of the secondary video being read out from a local storage;
    an auxiliary information analyzing part that analyzes the auxiliary information and extracts the display auxiliary information and the applied start time information from the auxiliary information, the auxiliary information being provided as a command to a processor in the auxiliary information analyzing part;
    a display screen forming part that synthesizes a screen of the primary video and a screen of the secondary video and forms a display screen in which the secondary video is superimposed on the primary video, the superimposed display screen being output from the display screen forming part; and
    a control part that controls the display screen forming part based on the display auxiliary information, the applied start time information and reference time information, in which the reference time information indicating a reference time based on which the primary video and the secondary video being reproduced in the first and second decoders, wherein:

when the applied start time information matches the reference time information, application of the display auxiliary information is started, and the control part controls the display screen forming part to superimpose the secondary video at a display position specified for the primary video according to the display auxiliary information;

no auxiliary information is included in a stream of the encoded video signal of the secondary video in the local storage; and control of the display position is implemented by the processor which executes software programs, and a part of the auxiliary information is afforded to the processor as a command of a JAVA language.

4. An information reproducing apparatus that reproduces information based on an encoded video signal of a primary video, an encoded video signal of a secondary video, and auxiliary information which includes display auxiliary information about a display position of the secondary video, position movement information about a movement of the display position of the secondary video and applied start time information which indicates a start timing at which the display auxiliary information is applied, the apparatus comprising:

a first decoder that decodes the encoded video signal of the primary video, the encoded video signal of the primary video being read out from a recording medium;

a second decoder that decodes the encoded video signal of the secondary video, the encoded video signal of the secondary video being read out from a local storage;

an auxiliary information analyzing part that analyzes the auxiliary information and extracts the display auxiliary information, the position movement information and the applied start time information from the auxiliary information, the auxiliary information being read out from the local storage;

a display screen forming part that synthesizes a screen of the primary video and a screen of the secondary video and forms a display screen in which the secondary video is superimposed on the primary video, the superimposed display screen being output from the display screen forming part; and a control part that controls the display screen forming part based on the display auxiliary information, the position movement information, the applied start time information and reference time information, in which the reference time information indicating a reference time based on which the primary video and the secondary video being reproduced in the first and second decoders, wherein:

when the applied start time information matches the reference time information, application of the display auxiliary information is started, and the control part controls the display screen forming part to superimpose the secondary video at a display position specified for the primary video according to the display auxiliary information and the display position of the secondary video moves according to the position movement information;

no auxiliary information is included in a stream of the encoded video signal of the secondary video in the local storage; and control of the display position is implemented by a processor which executes software programs, and a part of the auxiliary information is provided to the processor as a command of a JAVA language.

5. An information reproducing apparatus that reproduces information based on an encoded video signal of a primary video, an encoded video signal of a secondary video, and auxiliary information which includes display auxiliary information about a display position of the secondary video, size change information about a change of a display size of the secondary video and applied start time information which indicates a start timing at which the display auxiliary information is applied, the apparatus comprising:

a first decoder that decodes the encoded video signal of the primary video, the encoded video signal of the primary video being read out from a recording medium;

a second decoder that decodes the encoded video signal of the secondary video, the encoded video signal of the secondary video being read out from a local storage;

an auxiliary information analyzing part that analyzes the auxiliary information and extracts the display auxiliary information, the size change information and the applied start time information from the auxiliary information, the auxiliary information being read out from the local storage;

a display screen forming part that synthesizes a screen of the primary video and a screen of the secondary video and forms a display screen in which the secondary video is superimposed on the primary video, the superimposed display screen being output from the display screen forming part; and a control part that controls the display screen forming part based on the display auxiliary information, the size change information, the applied start time information and reference time information, in which the reference time information indicating a reference time based on which the primary video and the secondary video being reproduced in the first and second decoders, wherein:

when the applied start time information matches the reference time information, application of the display auxiliary information is started, and the control part controls the display screen forming part to superimpose the secondary video at a display position specified for the primary video according to the display auxiliary information and the display size of the secondary video changes according to the size change information;

no auxiliary information is included in a stream of the encoded video signal of the secondary video in the local storage; and control of the display position is implemented by a processor which executes software programs, and a part of the auxiliary information is provided to the processor as a command of a JAVA language.

* * * * *